(12) United States Patent
Tsuda et al.

(10) Patent No.: US 8,769,403 B2
(45) Date of Patent: Jul. 1, 2014

(54) SELECTION-BASED RESIZING FOR ADVANCED SCROLLING OF DISPLAY ITEMS

(75) Inventors: Takamoto Tsuda, Zushi (JP); Jenny Fredriksson, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 391 days.

(21) Appl. No.: 12/849,876

(22) Filed: Aug. 4, 2010

(65) Prior Publication Data
US 2012/0036428 A1 Feb. 9, 2012

(51) Int. Cl.
*G06F 17/00* (2006.01)

(52) U.S. Cl.
USPC .......................................... 715/252; 715/815

(58) Field of Classification Search
CPC ................................................ G06F 17/30905
USPC .................................. 715/252, 815
See application file for complete search history.

(56) References Cited

U.S. PATENT DOCUMENTS

| | | | |
|---|---|---|---|
| 2002/0080152 A1* | 6/2002 | Sudo et al. | 345/672 |
| 2008/0086699 A1* | 4/2008 | Antikainen et al. | 715/784 |

OTHER PUBLICATIONS

International Search Report and Written Opinion dated Oct. 20, 2011 issued in corresponding PCT application No. PCT/IB2011/052851, 11 pages.
International Preliminary Report on Patentability and Written Opinion issued in corresponding application PCT/IB2011/052851 dated Feb. 14, 2013.

* cited by examiner

*Primary Examiner* — Laurie Ries
*Assistant Examiner* — Shawn S Joseph
(74) *Attorney, Agent, or Firm* — Snyder, Clark, Lesch & Chung, LLP

(57) ABSTRACT

A device may receive a selection of a first one of portions of a document, changing sizes of at least some of the portions based on the selection, determining a first location of an index button in an index bar, identify one of the portions based on the determined first location of the index button, and display the identified portion.

20 Claims, 10 Drawing Sheets

SELECTION-BASED RESIZING FOR ADVANCED SCROLLING OF DISPLAY ITEMS

BACKGROUND

Despite recent advances in technology in writing or constructing software applications, computer programmers still assemble graphical user interface (GUI) software components. The components include, for example, list boxes, checklist boxes, combo boxes, radio buttons, pop-up menus, tool bars, scroll bars, etc.

SUMMARY

According to one aspect, a method may include receiving a selection of a first one of portions of a document, changing sizes of at least some of the portions based on the selection, determining a first location of an index button in an index bar, identifying one of the portions based on the determined first location of the index button, and displaying the identified portion.

Additionally, changing the sizes may include increasing sizes of portions that are adjacent to the selected portion.

Additionally, identifying may include locating a portion, of the document, that is associated with a symbol.

Additionally, changing sizes may include determining a length or height for the first one of the portions based on an available viewing area of a scrollable component that includes the index bar.

Additionally, the method may further include receiving a scroll event from an operating system or an application.

Additionally, a length or height of a first portion of the document, corresponding to a distance traveled by the index button, may be different from a length, in a second portion of the document, corresponding to the same distance traveled by the index button.

Additionally, the method may further include determining, for each of the portions of the document, an input weight based on the selection of the first one of the portions.

According to another aspect, a device may include a memory and a processor. The memory may store information representing an index bar including an index button and may store weights assigned to different portions of a document. The processor may modify, for each of the weights, a size of the portion to which the weight is assigned, determine a position of the index button in the index bar, and identify, in the document, a first portion that corresponds to the position and whose size has been modified. Additionally, the processor may display the identified first portion.

Additionally, the index bar may include at least one of a horizontal index bar or a vertical index bar.

Additionally, the device may include a tablet computer or a smart phone.

Additionally, the document may include a contact list. Additionally, a contact in the contact list corresponding to a location of a user selection may be displayed in a larger space or larger font than other portions of the contact list.

According to yet another aspect a computer-readable storage device may include computer-executable instructions. The computer-executable instructions may include instructions for receiving a selection of a first one of portions of a document, modifying sizes of the portions based on the selection, determining a first location of an index button in a scrollable component, identifying one of the portions based on the determined first location of the index button, and displaying the identified portion.

Additionally, the instructions for identifying one of the portions may include instructions for accessing an indexed portion of the document.

Additionally, the instructions for modifying may include instructions for determining a first ratio of a number of contacts under an index to a total number of contacts under all indices, determining a second ratio of an input weight for the index to a sum of all weights for the indices, determining a first ratio raised to a first power to obtain a first result, determining a second ratio raised to a second power to obtain a second result, multiplying the first result and the second result to produce a third result, and computing a first weight based on the third result.

Additionally, the instructions for modifying sizes further include instructions for, when the third result is lower than a minimum value, setting the third result to the minimum value.

Additionally, the instructions for modifying sizes may include instructions for adjusting a total size of second portions of the document based on a viewing area of the scrollable component and a number of the second portions, the second portions listed under an index.

Additionally, a ratio of a size of the index button to a size of a scroll track of an index bar included in the scrollable component may be approximately equal to a ratio of a size of a viewing port of the scrollable component to a size of the document.

Additionally, the instructions for determining the first location of the index button may include instructions for receiving a scroll event and determining the first location of the index button based on the scroll event.

Additionally, the scroll event may include an event notifying the scrollable component that the index button is dragged to a particular position on an index bar that is included the scrollable component or an event notifying the scrollable component that a scroll arrow has been activated via a touch screen.

Additionally, the instructions for displaying the identified portion may include instructions for graphically rendering the identified portion.

BRIEF DESCRIPTION OF THE DRAWINGS

The accompanying drawings, which are incorporated in and constitute part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements.

As used herein, the term "object" may include an object in the object-oriented programming paradigm. As used herein, the term "component" or "graphical user interface (GUI) component" may refer to a GUI object.

In advanced scrolling, a scrollable component may allow a viewer to designate or select one or more portions of a document. Once the portions are selected, the scrollable component may provide the viewer with a greater viewing area for the selected portions of the document. This may allow the viewer to quickly hone in on a specific item, within the document, that would otherwise occupy a smaller viewing area and, therefore, be more difficult to locate.

Figure 1A:
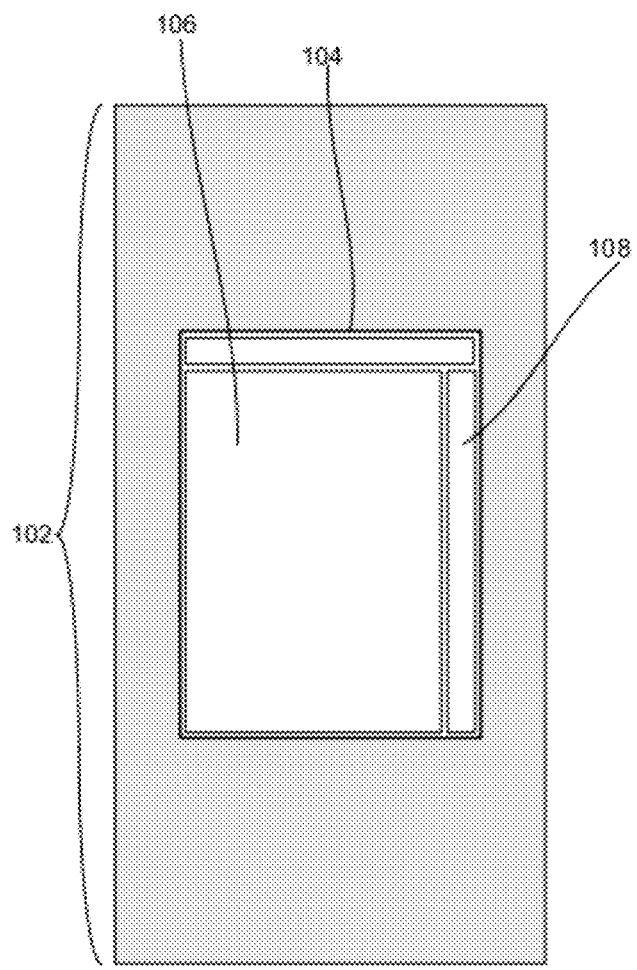
FIG. 1A shows an exemplary document and an exemplary scrollable component.
Figure 1B:
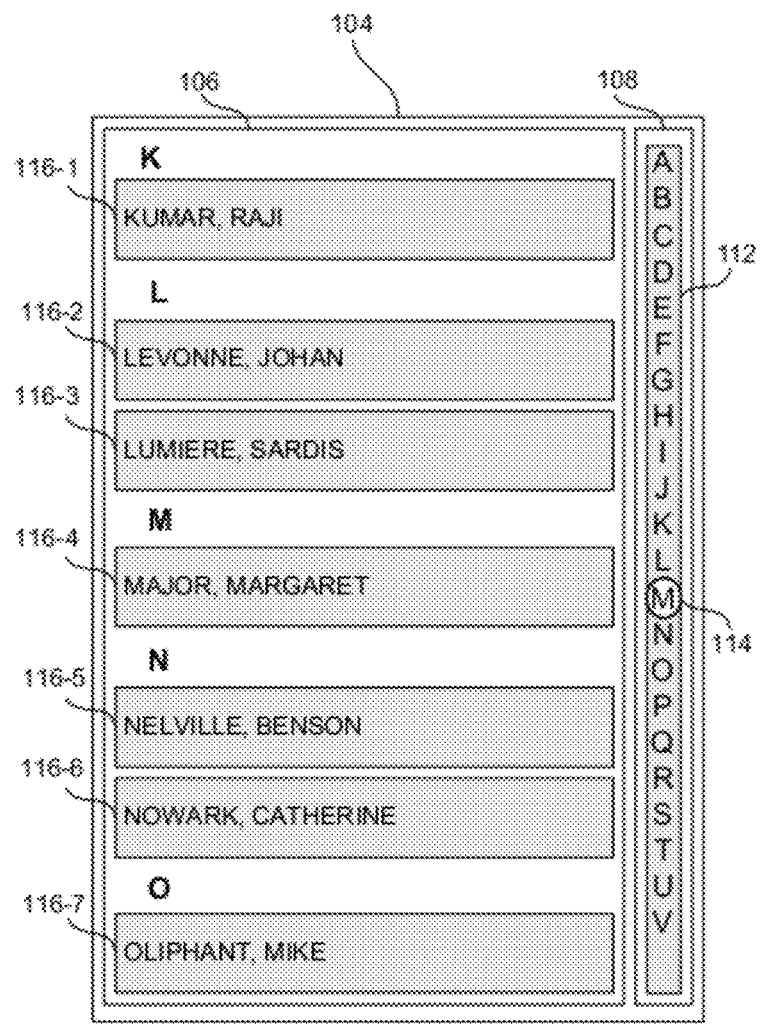
FIG. 1B shows exemplary components of the scrollable component of FIG. 1A according to one implementation.
Figure 1C:
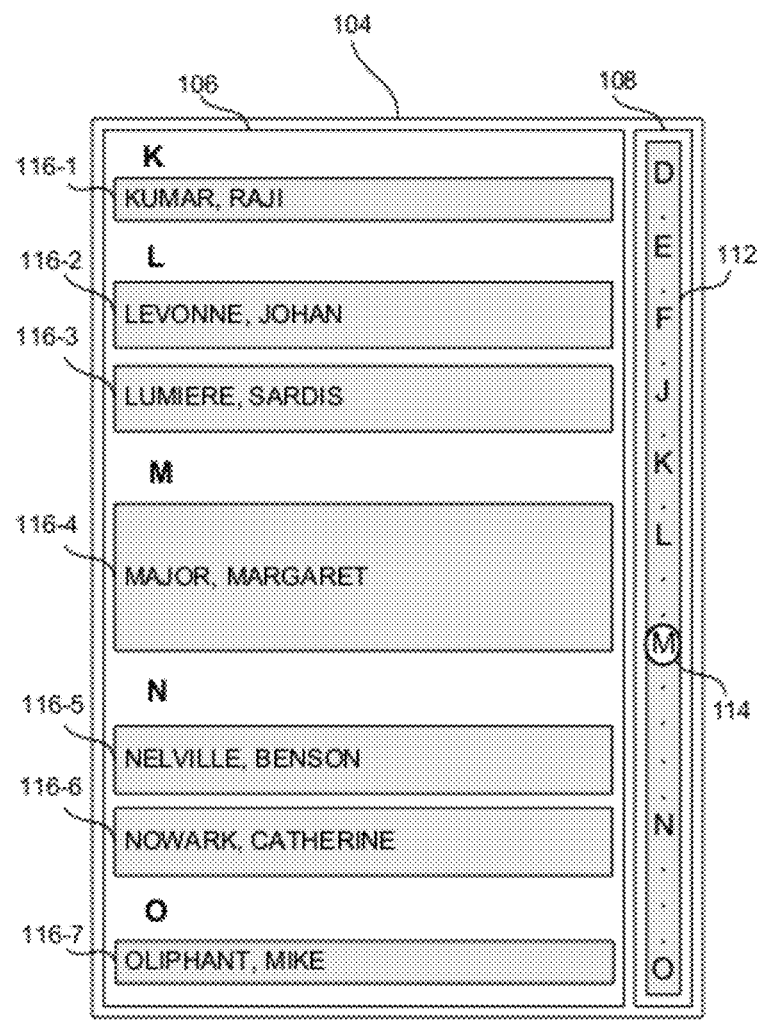
FIG. 1C shows exemplary components of the scrollable component of FIG. 1A according to another implementation.

FIGS. 1A through 1C illustrate the concept. FIG. 1A shows an exemplary document 102 and an exemplary scrollable component 104. Document 102 may include a bundle, aggregate, or set of data/information that a user may create/compose, edit, store, read (view), and/or delete. Examples of a document may include a contact list, web page, text document, spread sheet, drawing/illustration, etc. Document 102 may be stored in a persistent storage, either locally or at a remote device. An application may load portions or the entirety of document 102 into a local memory for processing (e.g., transfer document 102 from a remote device or read in document 102 from a local, persistent storage device).

Scrollable component 104 may include GUI portions of an application (not shown) that can create, edit, store, read, and/or delete document 102. As further shown in FIG. 1A, scrollable component 104 may include a viewing port 106 (e.g., a window, pane, display, etc.) though which the application or scrollable component 104 (collectively or individually referred to as "scrollable component 104") may display a portion or all of document 102. When scrollable component 104 displays entire document 102, scrollable component 104 may install or activate an index bar 108 as part of scrollable component 104.

FIG. 1B shows exemplary components of scrollable component 104 according to one implementation. As shown, index bar 108 may include scroll track 112 and index button 114. By dragging index button 114 on scroll track 112 (up or down in FIG. 1B), a user may scroll up/down document 102. In addition, index button 114 may display an index (e.g., a letter on index track 112) near which index button 114 is positioned.

In a different implementation, scrollable component 104 may include additional, fewer or different components than those illustrated in FIG. 1B. For example, in one implementation, scrollable component 104 may include an index bar 108 that includes a scroll arrow and excludes index button 114. In another implementation, scrollable component 104 may not include index bar 108 and may allow a user to scroll down by "dragging" a document relative to viewing port 106 or by activating a scroll arrow. In yet another implementation, index bar 104 may be touch-sensitive and may allow a user to use his/her finger to scroll.

As discussed above, viewing port 106 may display a portion (or all) of document 102. For example, in FIG. 1B, viewing port 106 displays contacts 116-1 through 116-7 (herein "contact 116" or "contacts 116"), which may be a subset of all contacts that are included in document 102. Each contact 116 includes a name, phone number (not shown), address (not shown), etc. In FIG. 1B, contacts 116 are listed in the alphabetical order of the names (e.g., last name).

In one embodiment, the position of index button 114 in scroll track 112 may correspond to the position of a document portion, in document 102, that viewing port 106 displays. For example, assume that index button 114 is located at the top of scroll track 112. In such a case, viewing port 106 may display the top portion of document 102. In another embodiment, the height of index button 114 relative to the height of scroll track 112 may correspond to the height of viewing port 106 relative to the height of document 102.

When a user drags index button 114 up or down along scroll track 112, contacts 116 in document 102 may "slide" up/down viewing port 106. However, in cases where particular contact 116 occupies a small area, the user may miss contact 116 while scrolling document 102. For example, assume that the user is looking for information about contacts whose last name starts with the letter "M." In such an instance, assuming that each of contacts 116 occupies the same amount of display space in viewing port 106, in scrolling through contacts 116, the user may miss Margaret Major contact 116-4.

FIG. 1C shows exemplary components of scrollable component 104 according to another implementation. In this implementation, scrollable component 104 may receive user input (e.g., user's touch) for selecting portions of documents 102. For example, a user may touch letter M to select the area in which contact 116-4 appears or touch contact 116-4 itself to select the area.

Scrollable component 104 may then weight the selected portions of document 102 (e.g., contacts that appear under letter M), such that the selected portions of document 102 occupy greater displayable space than other unselected portions of document 102. For example, assume that a user touches contact 116-4. Consequently, contacts 116 that are under the letter M may be provided with a larger space, as illustrated in FIG. 1C, and the user may more easily locate contact 116-4 by scrolling through document 102. Scrollable component 104 may also adjust the spacing between different indices in index bar 108 (e.g., more dots between M and other letters) to reflect the changes in displayed document 102.

In some implementations, document portions (e.g., contacts 116 under letter L or letter N) that are not selected may be given additional space, depending on their distances from the selected portions of document 102. For example, in FIG. 1C, contacts under the letter L and N are given more or larger display spaces than contact 116-1 under letter K. In some implementations, scrollable component 104 may use the additional space in modifying features that are associated with the appearance of contacts 116 (e.g., font sizes, shades, etc.).

By weighting the size of each of document portions selected by the user (via a touch), scrollable component 104 may increase the ease with which the user may access a particular displayable portion of document 102. In addition, the user may set/reset weights on different portions of document 102 by touching one or more areas in document 102 (e.g., a letter associated with the name) or portions of document 102.

Figures 2A, 2B:
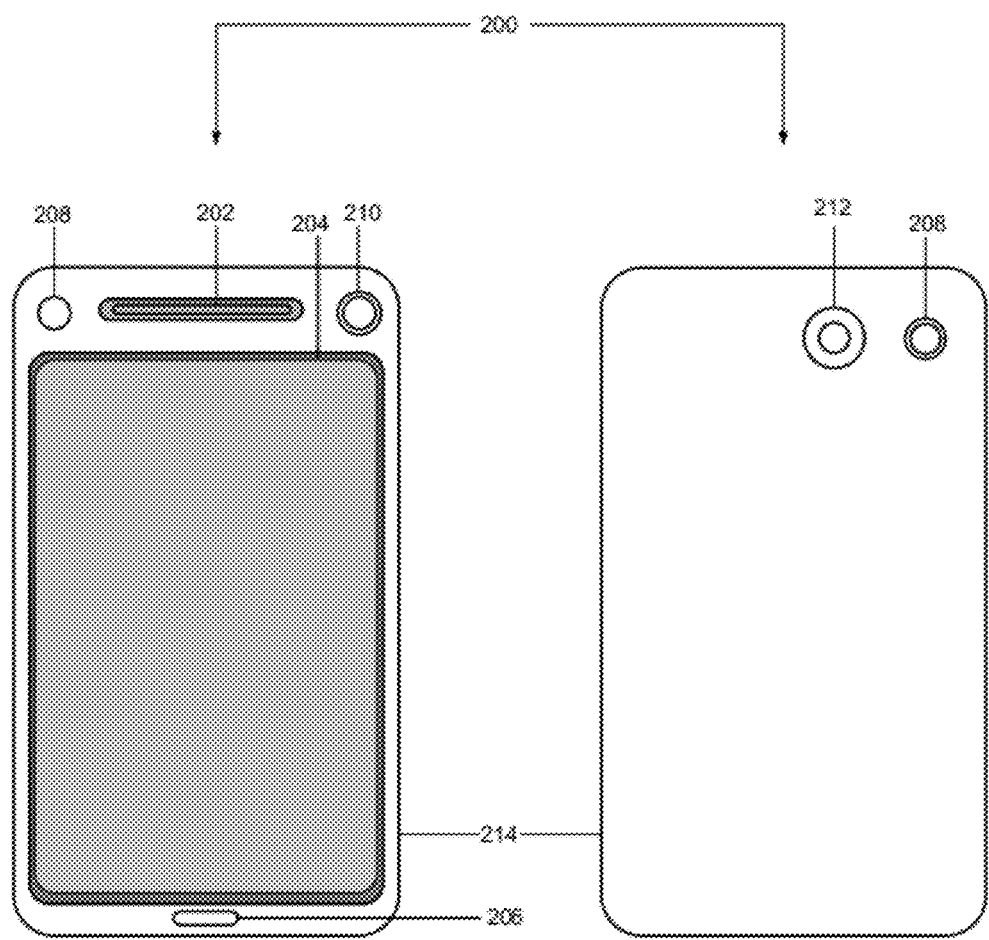
FIGS. 2A and 2B are front and rear views of an exemplary user device in which concepts described herein may be implemented.

FIGS. 2A and 2B are front and rear views, respectively, of an exemplary user device 200 in which concepts described herein may be implemented. Depending on the implementation, user device 200 may include any of the following devices with a display screen: a personal computer; a tablet computer; a smart phone (e.g., cellular or mobile telephone); a laptop computer; a personal communications system (PCS) terminal that may combine a cellular radiotelephone with data processing, facsimile, and/or data communications capabilities; a personal digital assistant (PDA) that can include a telephone; a gaming device or console; a music playing device; a peripheral (e.g., wireless display); a digital television; a digital camera; or another type of computational or communication device.

In this implementation, user device 200 may take the form of a smart phone (e.g., a cellular phone). As shown in FIGS. 2A and 2B, user device 200 may include a speaker 202, display 204, microphone 206, sensors 208, front camera 210, rear camera 212, and housing 214. Depending on the implementation, user device 200 may include additional, fewer, different, or different arrangement of components than those illustrated in FIGS. 2A and 2B.

Speaker 202 may provide audible information to a user of user device 200. Display 204 may provide visual information to the user, such as an image of a caller, video images received via cameras 210/212 or a remote device, etc. In addition, display 204 may include a touch screen via which user device 200 receives user input. The touch screen may receive multi-touch input or single touch input.

Microphone 206 may receive audible information from the user and/or the surroundings. Sensors 208 may collect and provide, e.g., to user device 200, information (e.g., acoustic, infrared, etc.) that is used to aid the user in capturing images or to provide other types of information (e.g., a distance between user device 200 and a physical object).

Front camera 210 and rear camera 212 may enable a user to view, capture, store, and process images of a subject in/at front/back of user device 200. Front camera 210 may be separate from rear camera 212 that is located on the back of user device 200. Housing 214 may provide a casing for components of user device 200 and may protect the components from outside elements.

Figure 3:
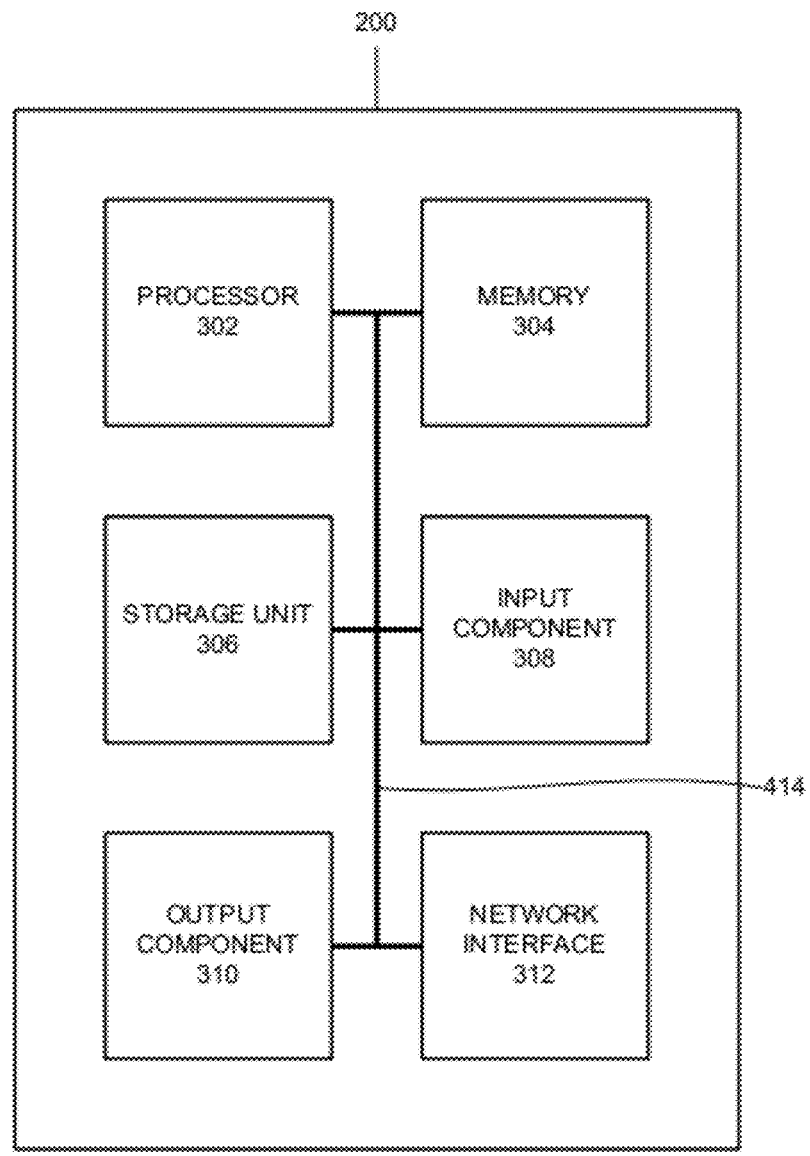
FIG. 3 is a block diagram of exemplary components of the user device of FIG. 2A and FIG. 2B.

FIG. 3 is a block diagram of exemplary components of user device 200. As shown in FIG. 3, user device 200 may include a processor 302, memory 304, storage unit 306, input component 308, output component 310, network interface 312, and communication path 314.

Processor 302 may include a processor, a microprocessor, an Application Specific Integrated Circuit (ASIC), a Field Programmable Gate Array (FPGA), and/or other processing logic (e.g., audio/video processor) capable of processing information and/or controlling user device 200.

Memory 304 may include static memory, such as read only memory (ROM), and/or dynamic memory, such as random access memory (RAM), or onboard cache, for storing data and machine-readable instructions. Storage unit 306 may include storage devices, such as a floppy disk, CD ROM, CD read/write (R/W) disc, hard disk drive (HDD), flash memory, as well as other types of storage devices.

Input component 308 and output component 310 may include a display screen, a keyboard, a mouse, a speaker, a microphone, a Digital Video Disk (DVD) writer, a DVD reader, Universal Serial Bus (USB) port, and/or other types of components for converting physical events or phenomena to and/or from digital signals that pertain to user device 200.

Network interface 312 may include a transceiver that enables user device 200 to communicate with other devices and/or systems. For example, network interface 312 may communicate via a network, such as the Internet, a terrestrial wireless network (e.g., a WLAN), a cellular network, a satellite-based network, a wireless personal area network (WPAN), etc. Network interface 312 may include a modem, an Ethernet interface to a LAN, and/or an interface/connection for connecting user device 200 to other devices (e.g., a Bluetooth interface).

Communication path 314 may provide an interface through which components of user device 200 can communicate with one another.

In different implementations, user device 200 may include additional, fewer, or different components than the ones illustrated in FIG. 3. For example, user device 200 may include additional network interfaces, such as interfaces for receiving and sending data packets. In another example, user device 200 may include a tactile input device.

Figure 4:
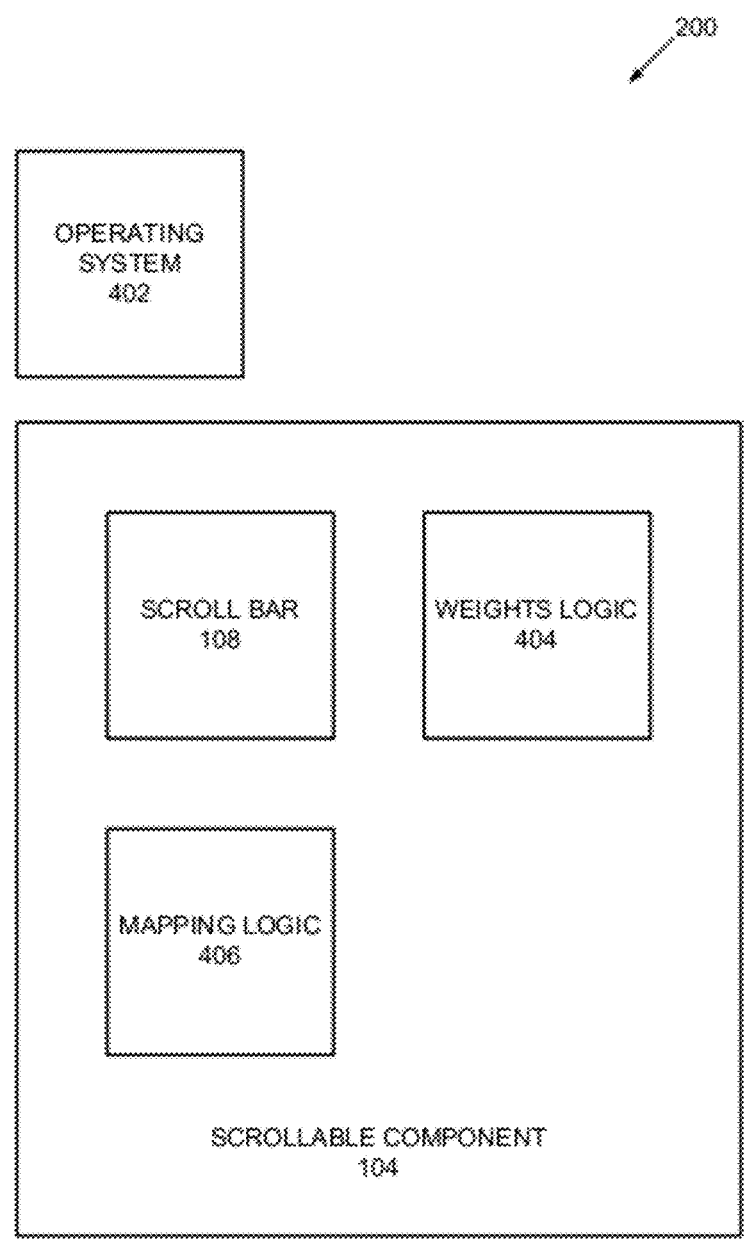
FIG. 4 is a functional block diagram the user device of FIGS. 2A and 2B.

FIG. 4 is a block diagram of exemplary functional components of user device 200. As shown, user device 200 may include an operating system 402 and a scrollable component 104. All or some of the components illustrated in FIG. 4 may be implemented by processor 302 executing instructions stored in memory 304 of user device 200.

Depending on the implementation, user device 200 may include additional, fewer, different, or different arrangement of functional components than those illustrated in FIG. 4. For example, user device 200 may include an application, device drivers, application programming interfaces, communication software, etc. In another example, depending on the implementation, scrollable component 104 may be part of a program or an application, such as a game, document editor/generator, utility program, or another type of application.

Operating system 402 may manage resources of user device 200. For example, operating system 402 may allocate clock cycles to different processes, allocate disk space, allocate memory, manage cache, perform security checks, etc. In particular, operating system 402 may translate input from input component 308 (e.g., mouse), generate a software event corresponding to the input (e.g., a scroll event), and route the event to recipient components (e.g., scrollable component 104).

Scrollable component 104 may include an application or GUI portions of the application. In some implementations, scrollable component 104 may be included in the application. Scrollable component 104 may process (e.g., create, edit, delete, store, read, etc.) one or more types of documents (e.g., a contact list, web page, text document, table, etc.). Scrollable component 104 may install and operate index bar 108 to provide the scrolling function when the size of document 102 exceeds the displayable area of viewing port 106.

When operating system 402 (or another software application/component) sends a scroll event to scrollable component 104, scrollable component 104 may display a portion of document 102 in viewing port 106 in accordance with the scroll event and place index button 114 at an appropriate location on scroll track 112. In displaying document 102, scrollable component 104 may perform advanced scrolling in accordance with weights logic 404 and/or mapping logic 406.

Weights logic 404 may include different weights that scrollable component 104 may apply in displaying different portions of document 102. For example, assume that weights logic 404 includes two values, 0.333 for letter A and 0.666 for letter B. In such an instance, scrollable component 104 may enlarge, via viewing port 106, contacts 116 whose last name starts with the letter B. Such contacts 116 may occupy twice the space occupied by contacts 116 whose last name starts with the letter A. Scrollable component 104 may set the weights in weights logic 404 when scrollable component 104 receives user input (e.g., touch) that selects one or more portions of document 102. For example, in the implementation above, the user may have selected contacts beginning with the letter B.

Figure 5:
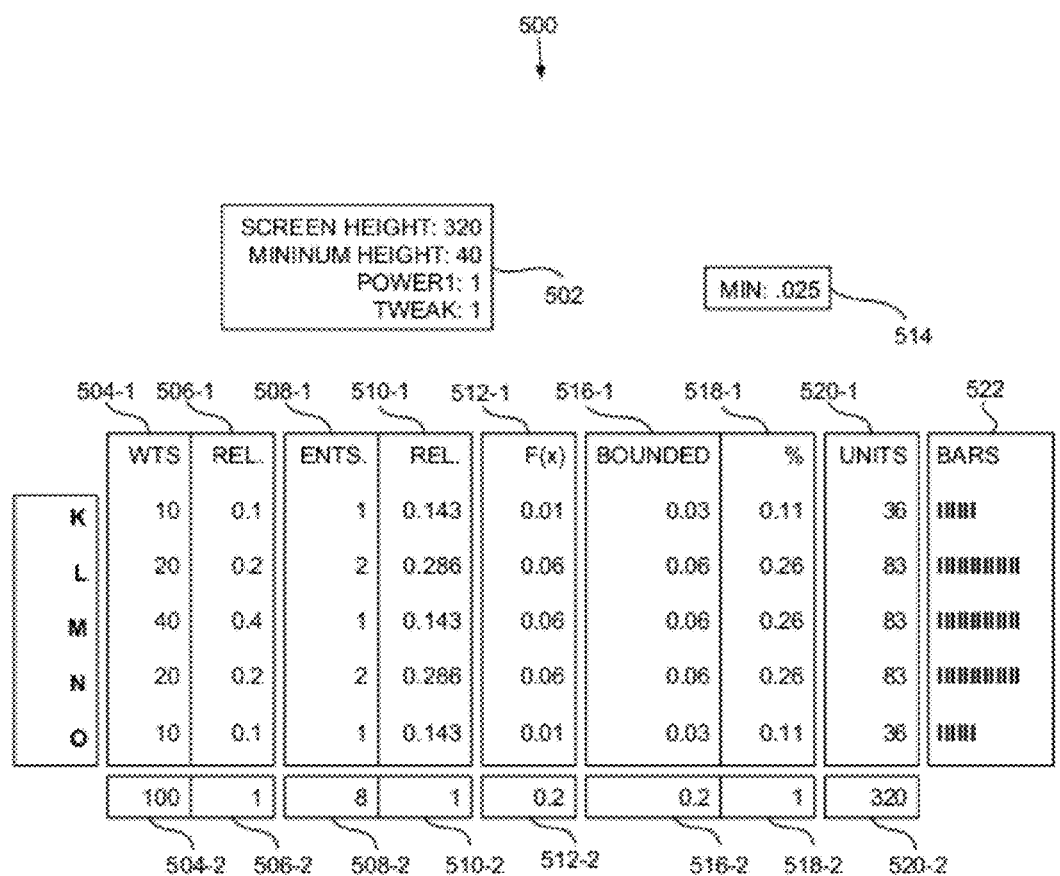
FIG. 5 shows an exemplary table that illustrates computing weights for different portions of the document of FIG. 1A.

FIG. 5 shows an exemplary table 500 that illustrates computing weights for different portions of document 102. Scrollable component 104 may follow implicit computational steps illustrated by various columns and fields in table 500 to obtain relative dimensions or weights for displaying portions of document 102.

In table 500, input weights (which may be determined by scrollable component 104 based on the user's touch on one or more portions of document 102 via viewing port 104) and a number of document portions (e.g., contacts 116) under different indices (e.g., different areas) may be entered at column 504-1 and 506-1, respectively. In addition, columns 518-1 and 520-1 may output the resulting sizes/weights that are calculated based on the values input at columns 504-1 and 506-1.

As shown, table 500 may include viewing port parameters list 502, weights column 504-1, relative weights column 506-1, number of entries column 508-1, entries percentages column 510-1, mapping function column 512-1, a minimum value field 514, bounded values column 516-1, display percentages column 518-1, number of pixels column 520-1, and bar column 522. In addition, table 500 may include a total weights field 504-2, total relative weights field 506-2, total entries field 508-2, total relative entries field 510-2, total mapping function values field 512-2, total bounded values field 516-2, total display percentages field 518-2, and total number of pixels field 520-2. Depending on the implementation, table 500 may include additional, fewer, or different fields/columns than those illustrated in FIG. 5.

Viewing port parameters list 502 may include parameters that are associated with viewing port 106, such as the SCREEN HEIGHT (e.g., the height of viewing port 106, e.g., in pixels, inches, centimeters, points, etc.), MINIMUM HEIGHT (e.g., the minimum height of displayed items under a letter (e.g., contacts 116-1 and 116-2 in document 102), TWEAK value (to be described below), and POWER1 (to be described below).

Weights column 504-1 may include a list of weights, in percentages, for each of a number of letters (e.g., "K," "L," "M," "N," and "O." in this example). In one implementation, the weights in weights column 504-1 may be determined based on whether a user touches viewing port 106 and/or based on the location of the user's touch. For example, assume that the user initially touches an area under letter M in viewing port 106. In such an instance, the area associated with letter M may be assigned a weight of 40, areas associated with letters L and N may be assigned the weight of 20, etc.

Relative weights column 506-1 may include a list of ratios, each ratio corresponding to a weight in weights column 504-1 divided by the value of total weights field 504-2. Number of entries column 508-1 may include a list of number of entries in an area (e.g., a number of contacts whose last names begin with the letter L, where L corresponds to an area). Entries percentages column 510-1 may include a list of ratios, each ratio corresponding to an entry in number of entries column 508-1 divided by the value of total entries field 508-2.

Mapping function column 512-1 may include a list of values that are obtained by applying a function (e.g., a mathematical function, program function, etc.) to corresponding values in relative weights column 506-1 and entries percentages column 510-1. In table 500, the function is $A^X B^{1/Y}$, where A, B, X, and Y are a value in column 506-1, a value in column 510-1, the value of POWER1 in viewing port parameters list 502 (e.g., 1), and the value of TWEAK in viewing port parameters list 502 (e.g., 1), respectively. Mapping function $A^X B^{1/Y}$ takes into account both the number of document portions that are associated with an area (e.g., portions that are associated with an index) and the input weights to determine weights for resizing the portions of document 102. The TWEAK value determines the relative contributions of a number of document portions in an area (e.g., number of contacts under a letter) and the input weight for the area.

Minimum value field 514 may include a minimum value Y that is used for computing the mathematical function MIN(X, Y) for each value X in mapping function column 512-1. In table 500, the value of minimum value field 514 is determined by the formula M/S*F, where M, S, and F are the MINIMUM HEIGHT in viewing port parameters field 502, SCREEN HEIGHT in viewing port parameters field 502, and the value in total mapping function values field 512-2, respectively.

Bounded values column 516-1 may include a list of values that are obtained from the values in mapping function column 512-1 by applying the function MIN(C, D), where the MIN(.) is the minimum of its arguments. C is a value from mapping function column 512-1 and D is a value of the minimum value field 514. Display percentages column 518-1 may include a list of values obtained by dividing each of the values in bounded values column 516-1 by the total bounded values field 516-2. Display percentages column 518-1 shows the number of pixels that may be occupied by a group of contacts 116 whose last names begin with one of letters K, L, M, N, and O.

Pixels column 520-1 may include a list of number of pixels. Each number corresponds to the combined heights of contacts 116 in an area (e.g., area corresponding to a letter (e.g., the height for two contacts 116-2 and 116-3 under letter L). Bar column 522 visually illustrates the number of pixels in accordance with number of pixels column 520-1 for each of the letters whose weights are provided in column 504-1 (e.g., each bar in number of pixels column 518-1 may correspond to approximately 7 pixels).

Each of fields 504-2, 506-2, 508-2, 510-2, 512-2, 516-2, 518-2, and 520-2 includes the sum of the values in the corresponding columns 504-1, 506-1, 508-1, 510-1, 512-1, 516-1, 518-1, and 520-1 respectively. Fields 504-2, 506-2, 510-2, and 518-2 may be used to check the correctness of the values in columns 504-1, 506-1, 510-1, and 518-1. For example, in one implementation, the values in fields 504-2, 506-2, 510-2, and 518-2 should match 100, 1, 1, and 1, respectively.

Total entries field 508-2 may include the sum of the values in number of entries column 508-1, and may be used to obtain the values in entries percentage column 510-1 (e.g., a value in 510-1=a corresponding value in column 508-1 divided by the value in 508-2). Total mapping function values field 512-2 may include the sum of the values in mapping function column 512-1, and may be used to obtain the value in minimum value field 514 (see below).

Total bounded values field 516-2 may include the sum of the values in bounded values column 516-1 and may be used to obtain the values in display percentages column 518-1 (e.g., % value in column 518-1=a corresponding value in column 516-1 divided by the value in 516-2). Field 520-2 includes the sum of the values in corresponding column 520-1. In an exemplary implementation, the values in column 520-1 to be correct, the value in field 520-2 should be equal to the screen height specified in viewing port parameters list 502 (e.g., 320).

Table 500 is provided for simplicity and illustrates determining weights and/or sizes for letters K, L, M, N, and O. In other implementations, a different table may be used to analyze weights for different letters, different alphabet sets (e.g., in different languages), or other tokens (e.g., numbers, symbols, links, coordinates, vectors, etc.) that identify or index different portions of document 102. Constructing such a table may entail using functions different from function $A^X B^{1/Y}$, using different TWEAK, MINIMUM HEIGHT and/or SCREEN HEIGHT values, using the MAX( ) and/or the MIN( ) function, etc.

Returning to FIG. 4, mapping logic 406 may include a function (e.g., software/hardware implemented function) or a table (e.g., a set of values) that maps positions of index button 114 to locations in document 102. In different implementations, mapping logic 406 may uniformly or non-uniformly map the positions of index button 114 to different locations in document 102. Scrollable component 104 may perform or enhance advanced scrolling via such mapping logic 406.

Figure 6A:
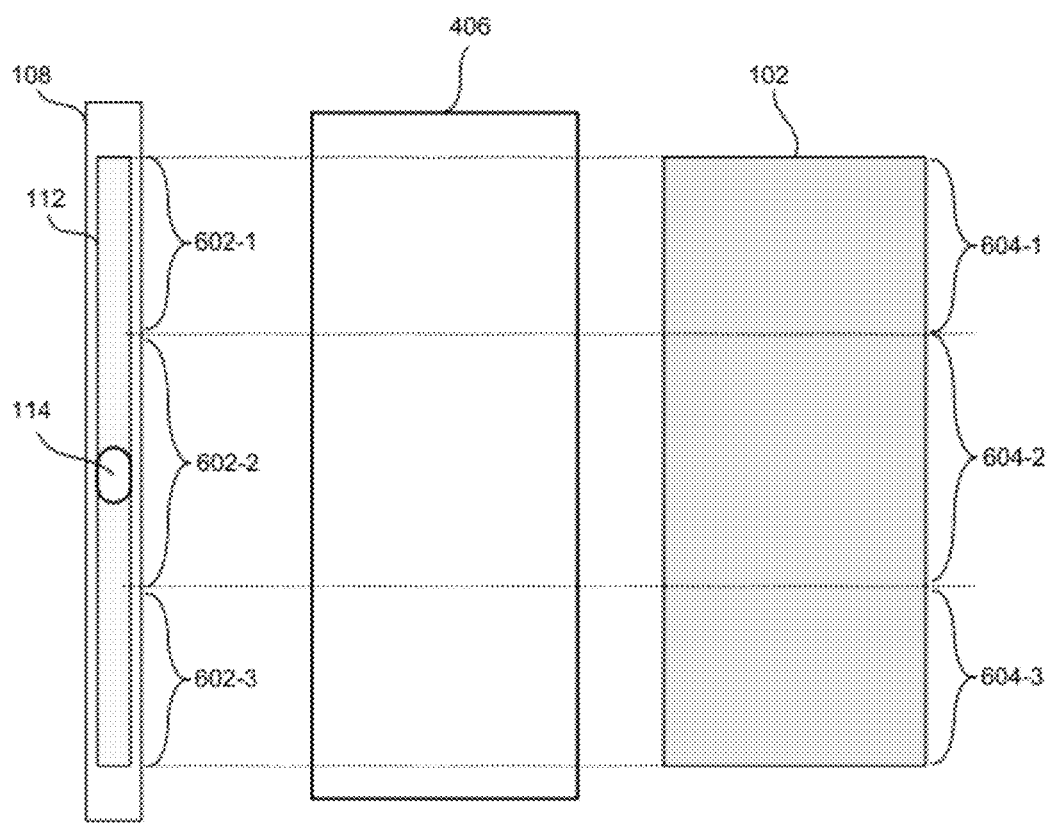
FIG. 6A illustrates mapping logic of FIG. 5 that uniformly maps positions of the index button on the scroll track of FIG. 1B to different locations in the document of FIG. 1A.

FIG. 6A illustrates mapping logic 406 that uniformly maps positions of index button 114 on scroll track 112 to different locations in document 102. For simplicity, the indices on index bar 108 are not shown in FIG. 6A. As shown, given a relative location of index button 114, mapping logic 406 designates the corresponding relative location in document 102. For example, assume that index button 114 is at the halfway point in scroll track 112. In this case, mapping logic 406 may map the halfway point to the relative position 0.5 in document 102 (e.g., the halfway point in document 102). In such implementations, a unit of movement (e.g., a pixel) of index button 114 in different portions 602-1, 602-2, and 602-3 of scroll track 112 may correspond to a same amount of scrolling in all of the corresponding portions 604-1, 604-2, and 604-3 of document 102. Index bar 108 may be scaled in accordance with any changes in the size of displayed document 102.

Figure 6B:
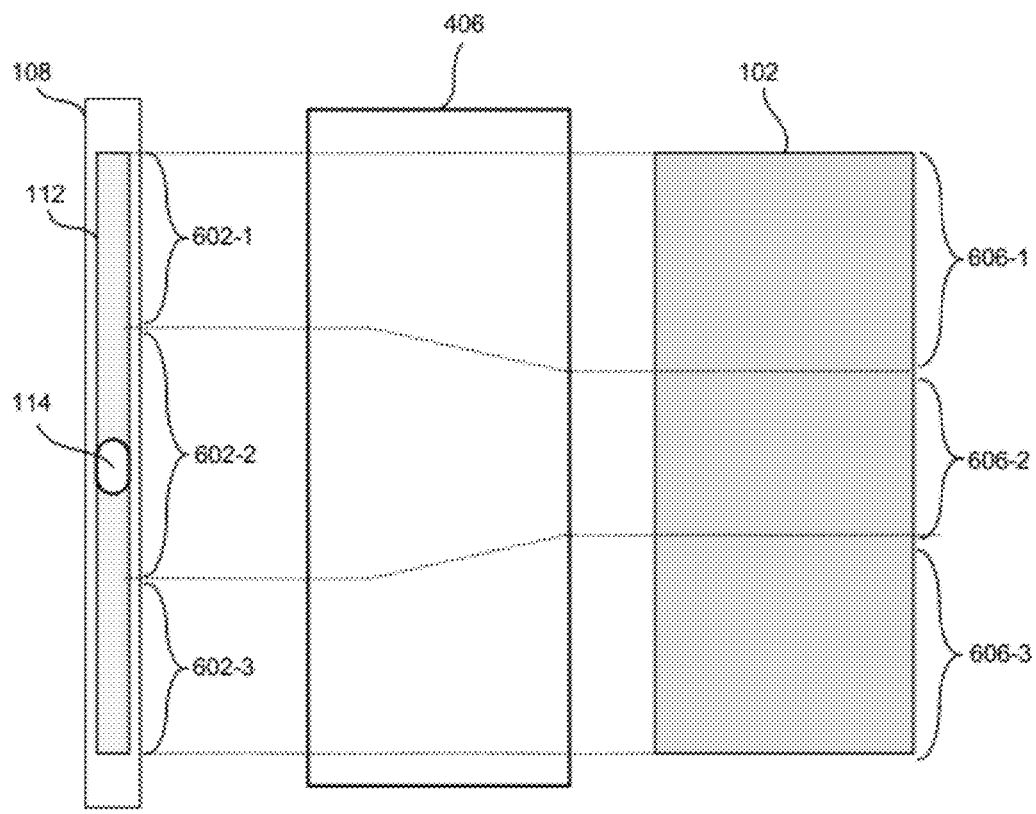
FIG. 6B illustrates mapping logic of FIG. 5 that non-uniformly maps positions of the index button on the scroll track of FIG. 1B to different locations in the document of FIG. 1A.

FIG. 6B illustrates mapping logic 406 that non-uniformly maps positions of index button 114 on scroll track 112 to different locations in document 102. As shown, mapping logic 406 maps a position of index button 114 in portion 602-1 of scroll track 112 to a location in portion 606-1 of document 102, a position in portion 602-2 to a location in portion 606-2, and a position in portion 602-3 to a location in portion 606-3.

In FIG. 6B, the mapping is non-uniform. For example, a position that corresponds to 0.333 (e.g., ⅓ on scroll track 112) may map to 0.38 in document 102. Because the relative sizes of portions 602-1, 602-2, and 602-3 of scroll track 112 are different from the relative sizes of corresponding portions 606-1, 606-2, and 606-3 of document 102, index button 114 traveling a given unit of distance in portion 602-1 of scroll track 112 may correspond to scrolling a different amount of document 102 than the amount scrolled when index button 114 travels the same unit of distance in other portions 602-2 and 602-3 of scroll track 112.

Scrollable component 104 may enhance advanced scrolling via mapping logic 406. In one implementation, scrollable component 104 may receive user selection of portions of document 102 (e.g., a letter in FIG. 1B). Furthermore, scrollable component 104 may determine weights for mapping different portions of document 102 to scroll track 112 based on calculations that are similar to those illustrated by table 500 in FIG. 5. Via mapping logic 406, scrolling component 104 may scroll different portions of document 102 (e.g., portions 606-1, 606-2, and 606-3) at different rates.

In FIGS. 6A and 6B, mapping logic 406 maps three different portions of scroll track 112 to three different portions (e.g., areas) of document 102. Depending on the implementation, mapping logic 406 may provide for mapping additional or fewer portions of scroll track 112 to additional or fewer portions of document 102.

Figure 7:
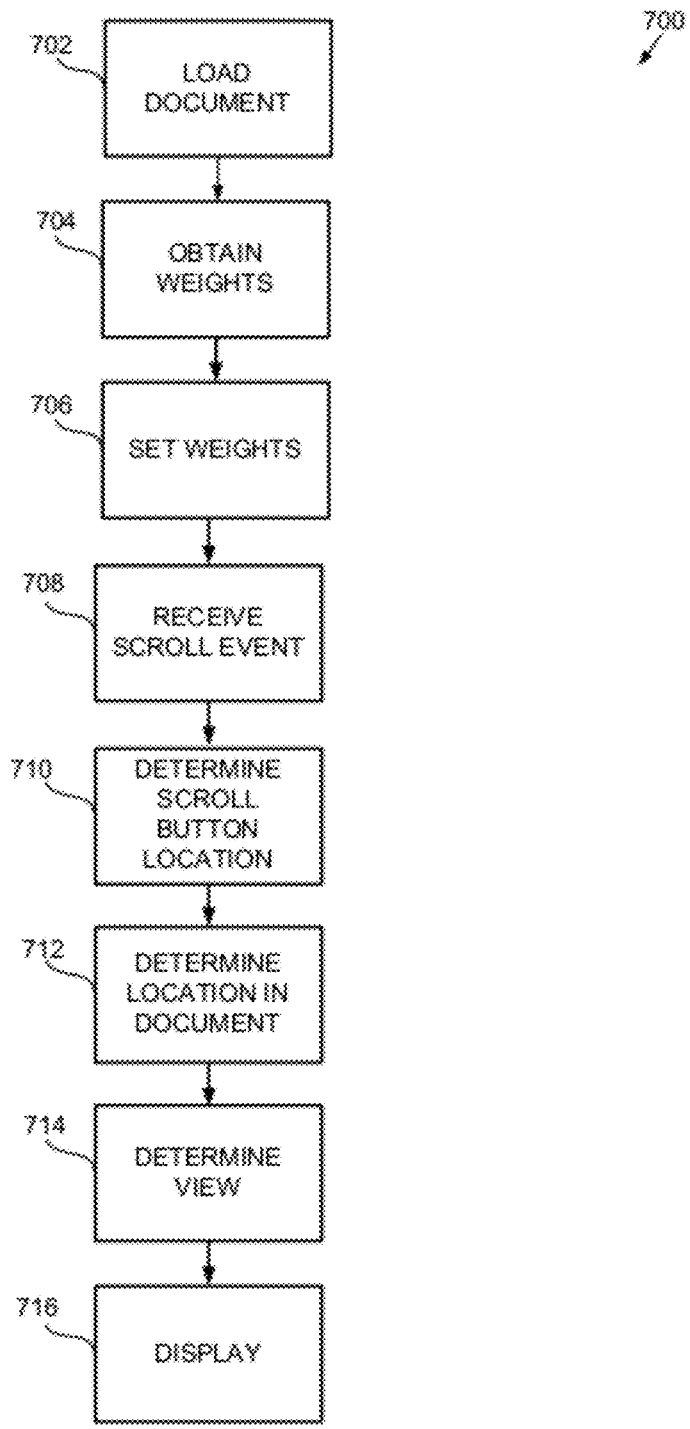
FIG. 7 is a flow diagram of an exemplary process for advanced scrolling.

FIG. 7 is a flow diagram of an exemplary process for advanced scrolling. Assume that scrollable component 104 is loaded in memory 304 of user device 200. Process 700 may start with scrollable component 104 loading document 102 (block 702). Depending on the size of document 102, scrollable component 104 may install index bar 108. In addition, scrollable component 104 may set index button 114 at a particular location (e.g., obtained from data that is stored along with document 102 in storage unit 306) on scroll track 112 and set viewing port 106 to display the corresponding portion of document 102.

Scrollable component 104 may obtain weights and data for weights logic 404 and mapping logic 406 (block 704). For example, in one implementation, scrollable component 104 may receive user input for selecting one or more portions of document 102 (e.g., touching a letter). Based on the selection, scrollable component 104 may determine input weights and/or data for calculating weights that may be used to resize portions of document 102. For example, assume that a user touches the letter M in FIG. 1C. In response, scrollable component 104 may generate weights 10, 20, 40, 20, and 10 for letters K, L, M, N, O (e.g., letters that are shown in viewing port 106). In some implementations, scrollable component 104 may also determine weights/data needed for mapping logic 406 to map different portions of scroll track 112 to portions of document 102.

Scrollable component 104 may set the weights in weights logic 404 and data in mapping logic 406 (block 706). For example, after obtaining the weights at block 704, scrollable component 104 may place the weights in column 504-1 (e.g., values that weights logic 404 may use to populate a set of parameters that are similar to the ones included in table 500). The data may establish an association between portions of scroll track 112 and document 102. The weights that are determined (block 704) and set (block 706) may depend on the type of document loaded (e.g., a web page, contact list, etc.) and the program for handling the document.

Scrollable component 104 may receive a scroll event (block 708). For example, operating system 402 or an application may generate an event (e.g., a software event (e.g., clicking on scroll arrow, touching index button 114 with one's finger, etc.) that is associated with GUI portions of scrollable component 104, and pass the event to scrollable component 104.

Scrollable component 104 may determine the location of index button 114 (block 710). For example, when a user drags index button 114 to a specific location on scroll track 112, scrollable component 104 may obtain the location of index button 114 from index bar 108 and/or a subcomponent of index bar 108 (e.g., scroll track 112 or index button 114). In another example, when a user clicks on a scroll arrow (not shown), scrollable component 104 may obtain the current location of index button 114 by adding or subtracting a fixed value/constant from the last location of index button 114. The location may be determined and/or expressed in terms of inches, centimeters, pixels, points, a ratio, etc.

Scrollable component 104 may determine, in document 102, a location that corresponds to the location determined at block 710 (block 712). For example, after obtaining the location of index button 114, scrollable component 104 may apply mapping logic 406 to coordinates (e.g., one or more numbers) corresponding to the location of index button 114. Mapping logic 406 may provide for uniform or non-uniform mapping between different portions of scroll track 112 and document 102.

Scrollable component 104 may determine items to display (block 714). For example, scrollable component 104 may determine a portion of document 102, to be viewed through viewing port 106 based on the location determined at block 712 and the dimensions of viewing port 106.

In some implementations, scrollable component 104 may create or complete a graphical representation of document 102 in memory 304 after weights are set at block 706. In creating the representation, based on the weights in weights logic 404, scrollable component 104 may provide for a magnified or a smaller version of portions of document 102. For example, assume that a user has touched the letter M on viewing port 106 of scrollable component 104 in FIG. 1B. After the touch, scrollable component 104 may enlarge contact 116-4 listed under the letter M, as illustrated in FIG. 1C.

In other implementations, scrollable component 104 may dynamically generate a graphical representation of document portions that are to be displayed via viewing port 106, and not yet generate graphical representations of other portions. That is, scrollable component 104 may generate the graphical representation "on need" basis, based on user input that specifies which portion of document 102 is to be displayed via viewing port 106.

At block 716, scrollable component 104 may display the portion of document 102. In some implementations, scrollable component 104 may display previously generated graphical data for needed for displaying document 102. In other implementations, scrollable component 104 may generate, on the fly, a graphical representation of the document portion that is determined at block 714.

In process 700, index bar 108 may be scaled in accordance with different settings that are associated with displaying document 102. Index bar 108 may change when the user changes the appearance of document 102.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, in the above, scrollable component 104 is illustrated and described as including a vertical index bar 108. In other implementations, scrollable component 104 may include a horizontal index bar and/or index bar 108.

The functions, formulas, and weights described above are exemplary. In different implementations, different functions, formulas, and/or weights may be used, depending on a particular type of document that scrollable component 104 handles. For example, scrollable component 104 may determine weights for selected contacts in a manner different from that for selected items in a web page.

In the above, while series of blocks have been described with regard to the exemplary process, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
providing, by a device, a first relative spacing between adjacent indices, provided on an index bar, corresponding to indexed portions, provided at a second relative spacing, in a document;
receiving, via a display of the device, a selection of a graphical representation of one of the indexed portions of the document corresponding to one of the adjacent indices:
changing, responsive to the selection, the second relative spacing of the indexed portions to create a third relative spacing of the indexed portions;
scaling, based on the third relative spacing of the indexed portions, the first relative spacing between the adjacent indices to create a fourth relative spacing between the adjacent indices;
determining a first location of an index button, in the index bar, with respect to the one of the adjacent indices;
identifying the selected indexed portion based on the determined first location of the index button; and
displaying, based on the identifying, the graphical representation of the selected indexed portion using the third relative spacing in the document, and the corresponding adjacent indices using the fourth relative spacing on the index bar.

2. The method of claim 1, wherein the changing includes:
increasing sizes of one or more of the indexed portions adjacent to the selected indexed portion.

3. The method of claim 1, wherein identifying includes:
locating the selected indexed portion, of the document, that is associated with a symbol corresponding to the first location of the index bar.

4. The method of claim 1, wherein the changing includes:
determining a length or a height for displaying the selected indexed portion based on an available viewing area of a scrollable component that includes the index bar.

5. The method of claim 1, further comprising:
receiving a scroll event, with respect to the display, from an operating system or an application.

6. The method of claim 1, wherein a traversed length of the selected indexed portion of the document, corresponding to a distance traveled by the index button, is different from a traversed length, in another one of the indexed portions of the document, corresponding to the same distance traveled by the index button.

7. The method of claim 1, further comprising:
determining, for each of the indexed portions of the document, an input weight based on the selection of the selected indexed portion.

8. A device comprising:
a memory to:
store information representing an index bar comprising an index button and indices, provided first relative spacing between adjacent ones of the indices, corresponding to indexed portions, provided at a second relative spacing, of a document; and
store weighting values assigned to each of the indexed portions of the document; and
a processor configured to:
modify, using one of the weighting values, the second relative spacing associated with a selected indexed portion, to which the one weighting value is assigned, to create a third relative spacing of the indexed portions;
scaling, based on the third relative spacing of the indexed portions, the first relative spacing between the adjacent ones of the indices to create a fourth relative spacing between the adjacent ones of the indices;
determine a position of the index button, in the index bar, with respect to one of the adjacent ones of the indices;
identify, based on the determined position, the selected indexed portion; and
display the selected indexed portion using the third relative spacing, and the corresponding adjacent ones of the indices using the fourth relative spacing on the index bar.

9. The device of claim 8, wherein the index bar includes at east one of:
a horizontal index bar; or
a vertical index bar.

10. The device of claim 8, wherein the device comprises:
a tablet computer or a smart phone.

11. The device of claim 8, wherein the document includes a contact list, and wherein a contact in the contact list corresponding to a location of a user selection is displayed in a larger space or larger font than other portions of the contact list.

12. A non-transitory computer-readable storage device including computer-executable instructions, the computer-executable instructions including instructions for:
providing, on a scrollable component, a first relative spacing between adjacent indices, provided on an index bar, corresponding to indexed portions, provided in a second relative spacing, of a document;
receiving a selection of one of the indexed portions, of the document, corresponding to one of the adjacent indices;
modifying the second relative spacing of the indexed portions, based on the selection, to create a third relative spacing of the indexed portions;
adjusting, based on the third relative spacing of the indexed portions, the first relative spacing between the adjacent indices to create a fourth relative spacing between the adjacent indices, wherein the fourth relative spacing differs from the first relative spacing;
determining a first location of an index button, in the scrollable component, with respect to the one of the adjacent indices;
identifying the selected indexed portion based on the determined first location of the index button; and
displaying the selected indexed portion using the third relative spacing in the document, and the corresponding adjacent indices using the fourth relative spacing on the index bar.

13. The non-transitory computer-readable storage device of claim 12, wherein the instructions for identifying the selected indexed portion include instructions for:
accessing the selected indexed portion of the document.

14. The non-transitory computer-readable storage device of claim 12, wherein the instructions for modifying include instructions for:
determining a first ratio of a number of contacts under an index to a total number of contacts under all indices in the index bar;
determining a second ratio of an input weight for the index to a sum of all weights for all of the indices;
determining the first ratio raised to a power to obtain a first result;
determining the second ratio raised to another power to obtain a second result;
multiplying the first result and the second result to produce a third result;
computing a first weight based on the third result; and
applying the first weight for the displaying of the selected index portion.

15. The non-transitory computer-readable storage device of claim 14, wherein the instructions for modifying further include instructions for:
when the third result is lower than a minimum value, setting the third result to the minimum value.

16. The non-transitory computer-readable storage device of claim 12, wherein the instructions for modifying include instructions for:
adjusting the second relative spacing of the indexed portions, of the document, based on a viewing area of the scrollable component and a number of the indexed portions.

17. The non-transitory computer-readable storage device of claim 12, wherein a ratio of a size of the index button to a size of a scroll track, included in the scrollable component, is approximately equal to a ratio of a size of a viewing port of the scrollable component to a size of the document.

18. The non-transitory computer-readable storage device of claim 12, wherein the instructions for determining the first location of the index button include instructions for:
receiving a scroll event; and
determining the first location of the index button based on the scroll event.

19. The non-transitory computer-readable storage device of claim 18, wherein the scroll event includes:
an event notifying the scrollable component that the index button is dragged to a particular position on the index bar; or
an event notifying the scrollable component that a scroll arrow has been activated via a touch screen.

20. The non-transitory computer-readable storage device of claim 12, wherein the instructions for displaying the selected index portion include instructions for graphically rendering the selected index portion.

* * * * *

UNITED STATES PATENT AND TRADEMARK OFFICE
CERTIFICATE OF CORRECTION

Page 1 of 1

PATENT NO. : 8,769,403 B2
APPLICATION NO. : 12/849876
DATED : July 1, 2014
INVENTOR(S) : Takamoto Tsuda et al.

It is certified that error appears in the above-identified patent and that said Letters Patent is hereby corrected as shown below:

In the Claims

Claim 9, column 13, line 34 should read: "least one of:"

Signed and Sealed this
Twenty-third Day of September, 2014

Michelle K. Lee
*Deputy Director of the United States Patent and Trademark Office*